United States Patent
Des Places et al.

(10) Patent No.: US 7,175,183 B2
(45) Date of Patent: Feb. 13, 2007

(54) ARRANGEMENT FOR THE GAS-TIGHT FIXING OF AN INLET MANIFOLD WITH A CONNECTOR FLANGE TO THE CYLINDER HEAD OF AN INTERNAL COMBUSTION ENGINE

(75) Inventors: Fabrice Faurien Des Places, Linoges (FR); Olivier Jeanne, St. Julien (FR); Xavier Parendel, Bersac sur Rivacier (FR)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 10/466,293

(22) PCT Filed: Dec. 20, 2001

(86) PCT No.: PCT/EP01/15167

§ 371 (c)(1),
(2), (4) Date: Mar. 22, 2004

(87) PCT Pub. No.: WO02/055859

PCT Pub. Date: Jul. 18, 2002

(65) Prior Publication Data

US 2004/0145121 A1 Jul. 29, 2004

(30) Foreign Application Priority Data

Jan. 10, 2001 (DE) .............................. 101 00 934

(51) Int. Cl.
*F02F 11/00* (2006.01)
(52) U.S. Cl. .................. 277/598; 277/916; 123/195 C; 123/198 E
(58) Field of Classification Search ................ 277/591, 277/598, 916, 596; 123/195 C, 198 E
See application file for complete search history.

(56) References Cited

U.S. PATENT DOCUMENTS 3,448,986 A * 6/1969 Dial et al. ................... 277/596
3,519,279 A * 7/1970 Wagner ....................... 411/542

(Continued)

FOREIGN PATENT DOCUMENTS

DE     3432608     3/1986

(Continued)

*Primary Examiner*—Alison K. Pickard
(74) *Attorney, Agent, or Firm*—Harness, Dickey & Pierce, P.L.C.

(57) ABSTRACT

Arrangement for the gas-tight fixing of an inlet manifold (1) with a connector flange to the cylinder head (2) of an internal combustion engine, with a sealing plate (3), arranged between the connector flange of the inlet manifold (1) and the cylinder head (2), in which at least one air passage (4, 5, 6, 7) for the at least one inlet tube of the inlet manifold (1) is embodied, with first connecting means (9) for connecting the sealing plate (3) to the inlet manifold (1), which are arranged in housings (10), in or on the sealing plate (3), with second connecting means for connecting the connector flange (1) and/or the sealing plate (3) to the cylinder head (2). A first sealing means (19) is provided on the sealing plate (3) on the one side (18) thereof, surrounding the at least one air passage (4, 5, 6, 7), for fitting to the inlet manifold (1), whereby at least one elastic element (13) is provided between the first connecting means (9) and the sealing plate (3).

12 Claims, 7 Drawing Sheets

U.S. PATENT DOCUMENTS

| | | | |
|---|---|---|---|
| 3,811,689 A * | 5/1974 | Farnam | 277/637 |
| 4,067,531 A * | 1/1978 | Sikula | 220/378 |
| 4,186,930 A * | 2/1980 | Shulke | 277/640 |
| 4,867,461 A * | 9/1989 | Shimmell | 277/293 |
| 5,333,884 A * | 8/1994 | Miyaoh et al. | 277/598 |
| 5,513,603 A * | 5/1996 | Ang et al. | 123/90.37 |
| 5,590,888 A | 1/1997 | Bruemmer et al. | 277/235 |
| 5,957,100 A * | 9/1999 | Frohwerk et al. | 123/90.38 |
| 6,371,073 B1 * | 4/2002 | Billimack et al. | 123/195 C |
| 6,789,386 B1 * | 9/2004 | Haerle | 60/323 |

FOREIGN PATENT DOCUMENTS

| | | | |
|---|---|---|---|
| DE | 3714528 | | 12/1987 |
| EP | 0601285 | | 6/1994 |
| JP | 05099087 | | 4/1993 |
| JP | 08210510 | | 8/1996 |
| JP | 2002-339815 | * | 11/2002 |

* cited by examiner

ARRANGEMENT FOR THE GAS-TIGHT FIXING OF AN INLET MANIFOLD WITH A CONNECTOR FLANGE TO THE CYLINDER HEAD OF AN INTERNAL COMBUSTION ENGINE

BACKGROUND

The present invention relates to a system for the gas-tight mounting of an intake manifold having a connector flange on the cylinder head of an internal combustion engine.

SUMMARY OF THE INVENTION

A system for the gas-tight mounting of an intake manifold having a connector flange on the cylinder head of an internal combustion engine is known from EP 0 601 285 B1. This system has a gasket made of elastomer material which can be attached to the side of the intake manifold flange facing the cylinder head. The known gasket has additionally at least two sealing surfaces which merge into one piece and which, during usage for the intended purpose, hermetically enclose at least two intake pipes of the intake manifold around the perimeter. However, the known system has the disadvantage that undesirable vibrations of the cylinder head of an internal combustion engine are transferred to the intake manifold.

An object of the present invention is to provide a system for the gas-tight mounting of an intake manifold on a cylinder head in which the transfer of vibrations between the engine and the intake pipe is reduced.

The present invention provides a system for the gas-tight mounting of an intake manifold having a connector flange on the cylinder head of an internal combustion engine, including a sealing plate which is situated between the connector flange of the intake manifold and the cylinder head and which has at least one air passage for the at least one intake pipe of the intake manifold, including first connecting means, which are situated in sockets formed in or on the sealing plate, for connecting the sealing plate to the intake manifold and second connecting means for connecting the connector flange and/or the sealing plate to the cylinder head, first sealing means being provided on one side of the sealing plate around the at least one air passage for attachment to the intake manifold, at least one elastic element being provided which acts between the first connecting means and the sealing plate, the first sealing means being designed as sealing ribs which have a sealing section and a moving section, and the first connecting means, the at least one elastic element, and the first sealing means including the sealing section and the moving section being disposed relative to one another so as to allow a vibratory relative movement between the sealing plate and the intake manifold.

Due to the design according to the present invention, it is possible to substantially reduce the transfer of vibrations between two components, in this case the cylinder head of an internal combustion engine and the intake manifold. Due to the present invention, it is in particular possible to decouple the vibrations to a large extent and still achieve a good seal between the intake manifold and the cylinder head. This is achieved according to the present invention in particular by designing the first sealing means as sealing ribs having a sealing section and a moving section and by placing the first connecting means on the sealing plate using elastic elements.

Furthermore, according to the present invention the sealing plate is situated at a distance from the connector flange of the intake manifold. This design makes it possible to achieve good decoupling of the vibrations between the cylinder head and the intake pipe.

Despite the vibratory relative movement between the sealing plate and the intake manifold, a particularly good seal is achieved in that the sealing ribs are stressed by compression means which are situated on the intake manifold. These compression means, acting on the sealing section of the sealing ribs, make it possible to achieve an excellent seal.

A further improvement is achieved in that, in the installed state, the moving section is essentially stress-free or is stressed to a lesser extent than the sealing section which is stressed by the compression means. Improved vibration insulation or vibration decoupling is achieved, without jeopardizing the sealing effect of the system according to the present invention, due to the fact that the moving section is essentially stress-free or stressed only to a lesser extent.

Furthermore, the compression means advantageously stress the sealing section in one direction, i.e., essentially parallel to the sealing plate. This not only makes a good seal possible, but also provides particularly good vibration insulation.

Furthermore, according to the present invention the compression means are grooves, situated on the mounting flange of the intake manifold, which accommodate the sealing section of the first sealing means.

A particularly good seal is achieved in that the sealing ribs have projections which, in particular, run in one direction, i.e., essentially parallel to the sealing plate.

Furthermore, according to the present invention the moving section is advantageously situated between the sealing section and the sealing plate.

According to a particularly advantageous embodiment of the present invention the first connecting means has a head which rests on a support section of the socket via the elastic element. The elastic element, acting between the socket and the connecting means, reduces the vibration transfer from the sealing plate to the intake manifold.

According to a refinement of the present invention, the support section is situated on a plane which is offset toward the intake manifold parallel to the sealing plate. In particular, the head of the first connecting means is countersunk and a flat design of the system according to the present invention is thereby achieved.

Furthermore, according to the present invention the sockets have recesses for the first connecting means, the first connecting means extending through them.

Particularly good vibration decoupling in different directions is achieved by routing the first connecting means in the first recess through the elastic elements.

A particularly good seal is also achieved by providing second sealing means on another side of the sealing plate for attachment to the cylinder head.

Furthermore, it has proved to be of value for the sealing plate to have passages for the second connecting means.

BRIEF DESCRIPTION OF THE DRAWINGS

An advantageous embodiment of a system according to the present invention is explained in greater detail in the following based upon the drawing.

DETAILED DESCRIPTION

Figure 1:
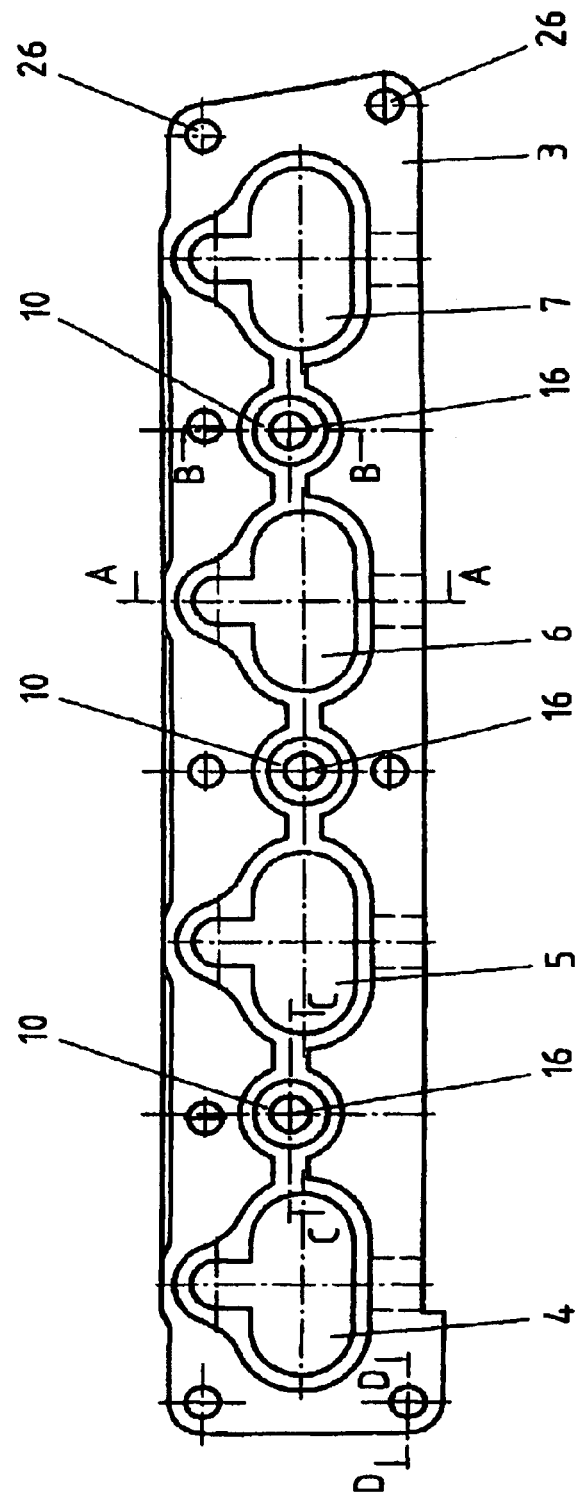
FIG. 1 shows a top view of a sealing plate according to the present invention.

A system for the gas-tight mounting of an intake manifold 1 having a connector flange on cylinder head 2 of an internal combustion engine is illustrated in the figures. The system according to the present invention has a sealing plate 3 which may be situated between the connector flange of intake manifold 1 and cylinder head 2. While sealing plate 3 is illustrated individually in FIGS. 1 and 3 through 7, the detailed illustration of sealing plate 3 in FIG. 2 shows it in its assembled state in which it is situated between intake manifold 1 and cylinder head 2 of an internal combustion engine 2. In the embodiment illustrated in FIG. 1, sealing plate 3 has four air passages 4, 5, 6, 7 for the four intake pipes of intake manifold 1.

First connecting means 9 are provided for connecting sealing plate 3 to intake manifold 1, the connecting means being situated in a socket 10 formed in sealing plate 3. In the embodiment illustrated in FIG. 2, the first connecting means are designed as a bolt having an extended head 11 on its side facing cylinder head 2 and having a widened section 12 at its end facing connector flange 1. Other suitable connecting means, screws having a thread, for example, may also be used instead of bolt 9 shown in FIG. 2. These screws may either be screwed directly into the connector flange, or, together with a nut, form a connection between sealing plate 3 and connector flange 1.

An elastic element 13 for first connecting means 9 is provided in the area of socket 10. Elastic element 13 is situated between first connecting means 9 and sealing plate 3 in such a way that an elastically resilient connection is created between sealing plate 3 and connector flange 1. For this purpose, head 11 of connecting means 9 rests on elastic element 13 which is situated on the bottom of socket 10.

Socket 10 has a cylindrical section 14 which is situated on the side of sealing plate 3 facing intake manifold 1. This cylindrical section 14 is delimited by a support section 15 at its end facing intake manifold 1; head 11 of first connecting means 9 may rest on the support section. Support section 15 is situated on a plane which is offset toward intake manifold 1 parallel to sealing plate 3. This results in head 11 of first connecting means 9 being countersunk. Furthermore, socket 10 has recesses 16, through which first connecting means 9 extend. Guide section 17 of elastic elements 13 extends in the area of recesses 16 in such a way that first connecting means 9 are guided through elastic elements 13 in recess 16.

Figure 2:
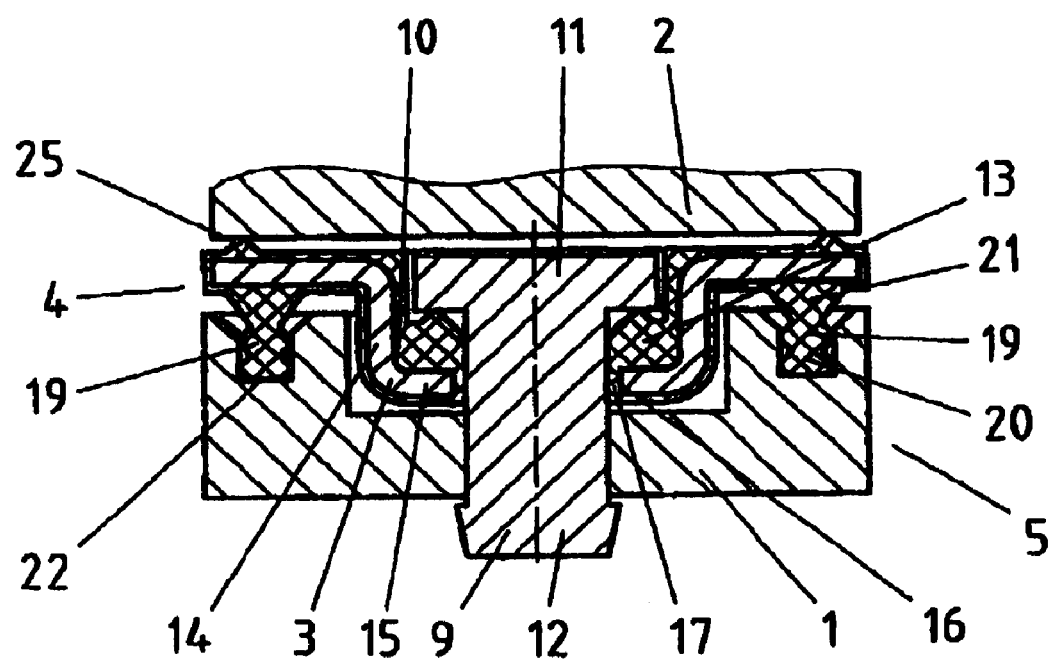
FIG. 2 shows a section through the sealing plate illustrated in FIG. 1 along line C—C in the installed state.
Figure 3:
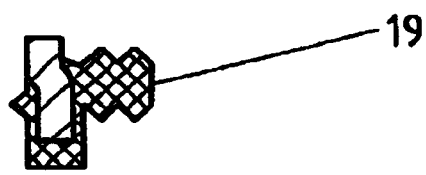
FIG. 3 shows a section through the sealing plate illustrated in FIG. 1 along line A—A.
Figure 3:
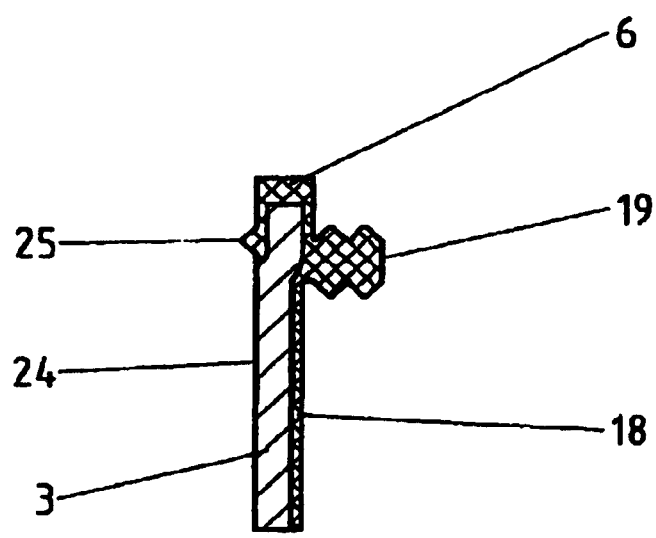
Figure 4:
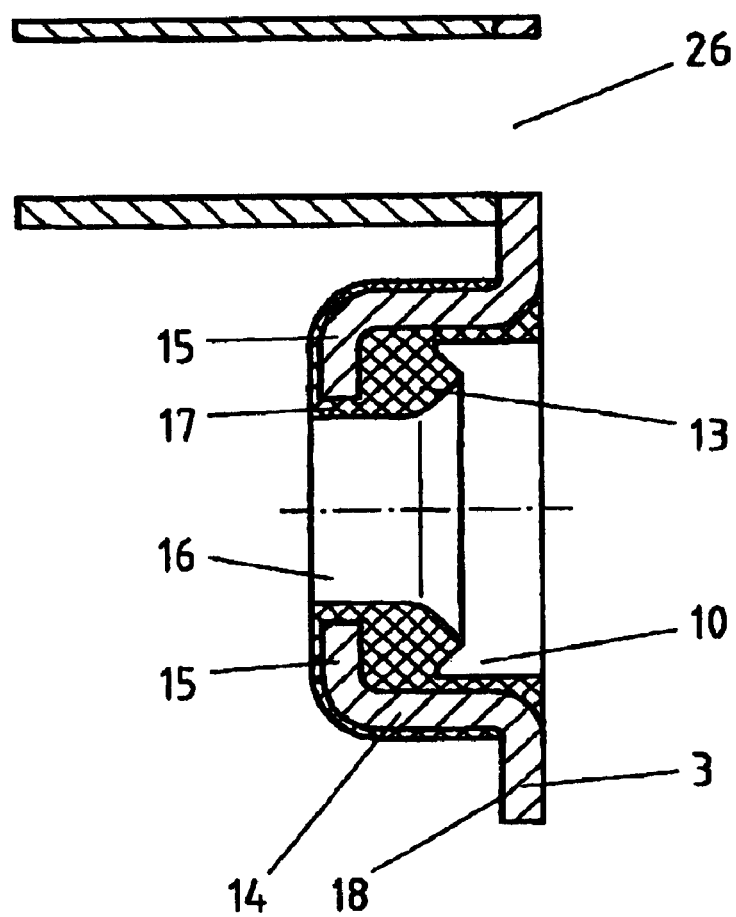
FIG. 4 shows a section through the sealing plate illustrated in FIG. 1 along line B—B.
Figure 5:
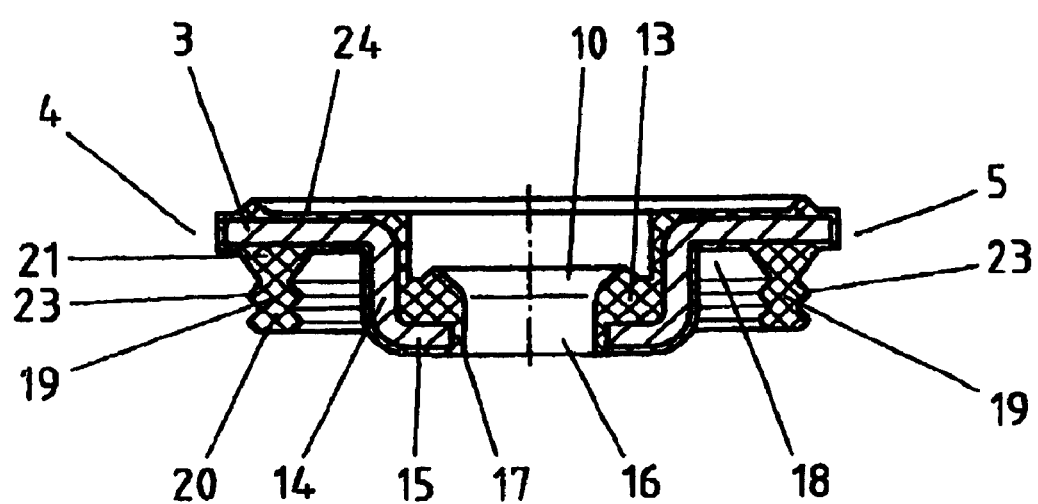
FIG. 5 shows a section through the sealing plate illustrated in FIG. 1 along line C—C.
Figure 6:
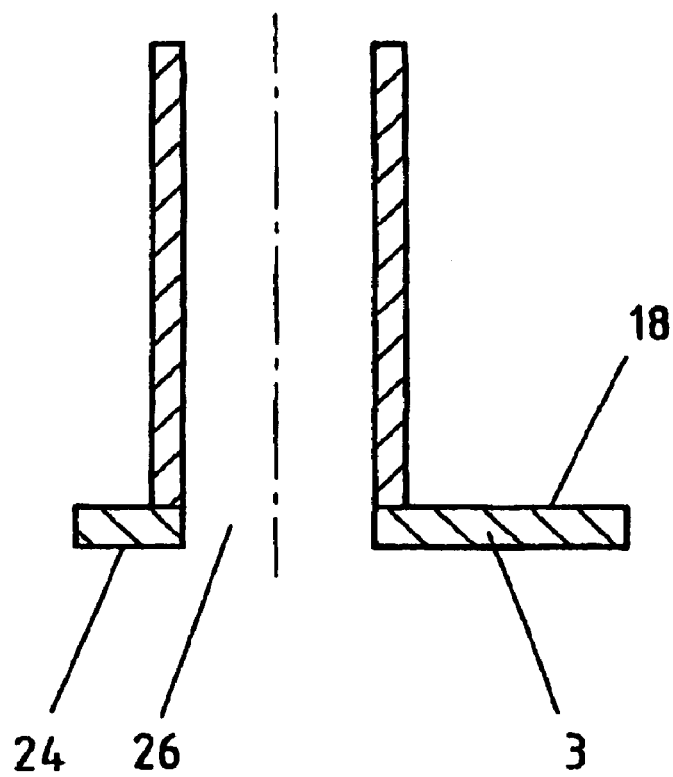
FIG. 6 shows a section through the sealing plate illustrated in FIG. 1 along line D—D.
Figure 7:
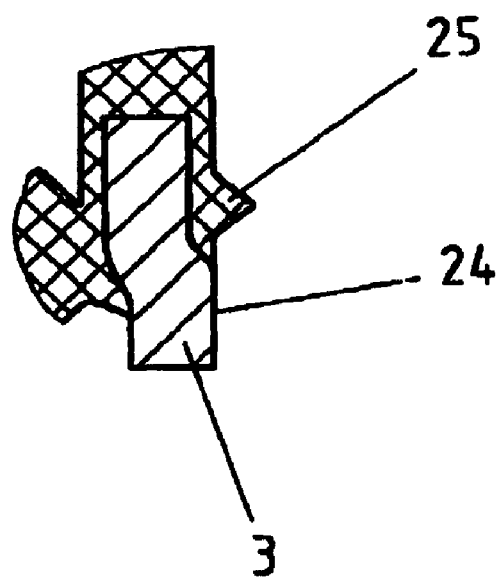
FIG. 7 shows an enlarged illustration of a detail from FIG. 3.

Overall, sealing plate 3, made of metal, shown in FIG. 1 has three sockets 10, each having one recess 16, sockets 10 each being situated between air passages 4, 5 or 5, 6 or 6, 7, respectively.

On its one side 18 around air passages 5, 6, 7, 8, sealing plate 3 has sealing means 19 intended to rest on intake manifold 1. First sealing means 19 each extend around an air passage 5, 6, 7, 8 in a closed line. First sealing means 19 are designed as sealing ribs which have a sealing section 20 and a moving section 21. According to the present invention, the sealing ribs are made of an elastomer which is attached to sealing plate 3 by vulcanization. For achieving a good seal, sealing ribs 19 are stressed by compression means 22 situated on intake manifold 1. In the embodiment shown in FIG. 2, compression means 22 are designed as grooves which are formed in the connector flange of intake manifold 1 and which accommodate sealing sections 20 of first sealing means 19. Compression of sealing sections 20 via grooves 22 is achieved by grooves 22 having an inside dimension which is slightly smaller than the outside dimension of the sealing ribs prior to insertion into groove 22. In this embodiment, sealing sections 20 are stressed by compression means 22 in one direction, i.e., essentially parallel to sealing plate 3.

Moving section 21 is situated between sealing section 20 and sealing plate 3. In the installed state, moving section 21 is essentially stress-free or is stressed to a lesser extent than sealing section 20 stressed by compression means 22.

For achieving a better seal, sealing means 19 have projections 23 which run in one direction, i.e., essentially parallel to sealing plate 3 and extend in particular along the entire periphery of first sealing means 19.

As can be seen in FIG. 2, sealing plate 3 is situated at a distance from the connector flange of intake manifold 1. First connecting means 9, sockets 10 for first connecting means 9 including elastic element 13, and first sealing means 19 are designed and situated in such way that a vibratory relative movement is made possible between sealing plate 3 and intake manifold 1. Decoupling of vibrations between cylinder head 2 of an internal combustion engine and intake manifold 1 may be achieved or improved due to this vibratory relative movement.

To achieve a good seal between sealing plate 3 and cylinder head 2, sealing plate 3 has, on its other side 24, second sealing means 25 intended to rest on cylinder head 2. Second sealing means 25 are made of an elastomer which is attached to sealing plate 3 by vulcanization. Second sealing means 25 each extend around an air passage 4, 5, 6, 7 in a closed line.

Furthermore, sealing plate 3 has passages 26 for second connecting means with which the connector flange of intake manifold 1 or sealing plate 3 may be directly connected to cylinder head 2. A total of eight passages 26 are provided in the embodiment illustrated in FIG. 1.

What is claimed is:

1. A system for a gas-tight mounting of a cylinder head of an internal combustion engine to an intake manifold having a connecting flange, the system comprising:

a sealing plate disposed between the connector flange and the cylinder head having at least one socket and at least one air passage corresponding to an intake pipe of the intake manifold;

a first connecting element disposed in the at least one socket and configured to connect the sealing plate to the intake manifold;

a second connecting element configured to connect at least one of the connector flange and the sealing plate to the cylinder head;

a first sealing element disposed on a first side of the sealing plate and around the at least one air passage and configured to rest against the intake manifold, the first sealing element including a sealing rib having a sealing section and a moving section;

at least one elastic element disposed between the first connecting element and the sealing plate, wherein the first connecting element, the first sealing element and the at least one elastic element are situated so as to allow a vibratory relative movement between the sealing plate and the intake manifold; and a compression element disposed on the intake manifold and configured to stress the sealing rib, wherein the compression element stresses the sealing section in a direction essentially parallel to the sealing plate.

2. The system as recited in claim 1, wherein the sealing pate is disposed at a distance from the connector flange.

3. The system as recited in claim 1, wherein the moving section is stressed to a lesser extent than the sealing section.

4. The system as recited in claim 1, wherein the compression element includes a groove formed on the connection flange.

5. The system as recited in claim 1, wherein the sealing rib includes a plurality of projections extending essentially parallel to the sealing plate.

6. The system as recited in claim 1, wherein the moving section is disposed between the sealing section and the sealing plate.

7. The system as recited in claim 1, wherein the first connecting element includes a head resting on a support section of the socket via the elastic element.

8. The sealing as recited in claim 7, wherein the support section is disposed in a plane parallel to the sealing plate and offset from the sealing plate toward the intake manifold.

9. The system as recited in claim 1, wherein the socket includes a recess for receiving the first connecting element, the first connecting element extending through the recess.

10. The system as recited in claim 9, wherein the first connecting element extends through the elastic element and the recess.

11. The system as recited in claim 1, further comprising a second sealing element disposed on a second side of the sealing plate and configured to rest against the cylinder head.

12. The system as recited in claim 1, wherein the sealing plate includes at least one passage configured to receive the second connecting element.

* * * * *